(No Model.)

J. G. STOCKS.
TWO WHEELED VEHICLE.

No. 310,621. Patented Jan. 13, 1885.

WITNESSES
Wilmer Bradford
Joseph Cooney

INVENTOR
John G. Stocks
By C. W. M. Smith
Attorney

UNITED STATES PATENT OFFICE.

JOHN G. STOCKS, OF SAN FRANCISCO, CALIFORNIA.

TWO-WHEELED VEHICLE.

SPECIFICATION forming part of Letters Patent No. 310,621, dated January 13, 1885.

Application filed February 23, 1884. (No model.)

*To all whom it may concern:*

Be it known that I, JOHN G. STOCKS, a citizen of the United States, residing at San Francisco, in the county of San Francisco and State of California, have invented a new and useful Two-Wheeled Vehicle, of which the following is a specification.

The object of my invention is to provide an easy-riding two-wheeled vehicle in which the body and seat are adapted to swing between the shafts in an independent manner without direct connection with the shafts, springs, or axle. I accomplish this object by the means illustrated in the accompanying drawings, forming a part of this specification, and in which—

Figure 1:
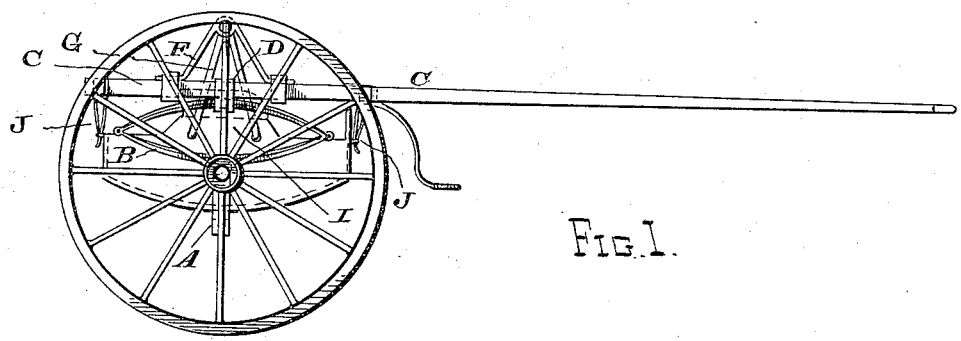
Figure 2:
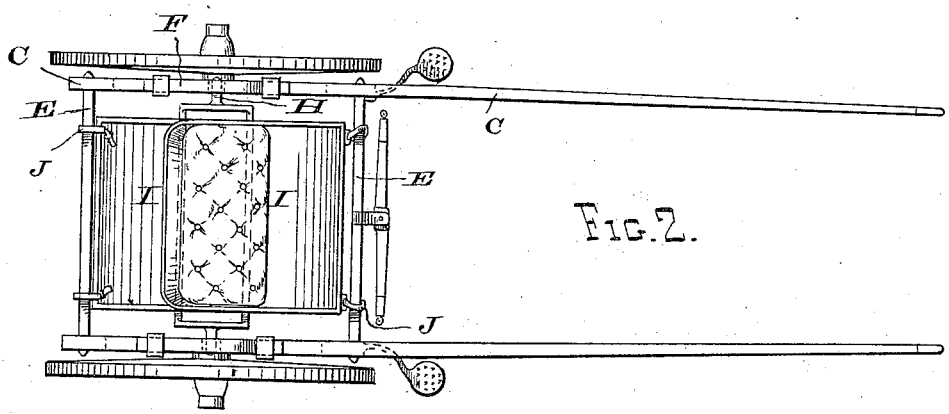
Figure 3:
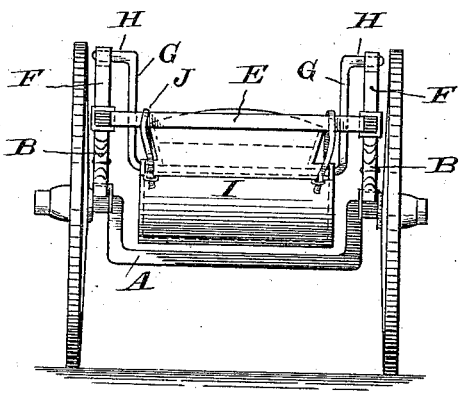

Figure 1 is a side elevation of a vehicle embodying my improvements. Fig. 2 is a top or plan view of the same. Fig. 3 is a rear elevation.

Similar letters of reference are used to indicate like parts throughout the several figures.

A represents the axle of my two-wheeled vehicle, bent as shown, to which is clipped the lower part or leaves of the elliptic springs B, in the usual way and manner. Upon these elliptic springs are placed the shafts C, to which the upper part or leaves of the elliptic springs are also clipped by the bands D. The usual cross-bars, E, connect the shafts together at the front and rear, to the former of which the whiffletree is attached. Upon the top of each shaft is bolted a bracket, F, and these brackets receive the outwardly projecting pintles H H of the irons G, which support the seat and body I of my vehicle, the said pintles having their bearings in a hole made in the upper part of the brackets. These supporting-irons extend downward between the shafts, alongside of and under the seat or body of the vehicle, at which point they are branched or forked and securely bolted to the vehicle, and thus the body is suspended and made to swing on the two pivotal points of the brackets above the axle and between the shafts and elliptic springs, yet independent of them. The body is constructed in the form shown, and is balanced so that the weight is distributed more nearly upon the pivotal points.

In order to keep the body steady and prevent too much swaying thereof, straps J J, of leather or india-rubber, extend from the cross-bars and pass under the body at the four opposite corners, at which points they are confined to the body, as shown. If found desirable, a central strap may also be employed.

By the construction above described the body is prevented from receiving the jar and vibration so incident to vehicles of this class when passing over rough places, and the whole vehicle is easy-going, easy-riding, and very simple in construction, and entirely destroys the action of the horse upon the body of the vehicle.

Having thus described my invention, what I claim, and desire to secure by Letters Patent, is—

In a two-wheeled vehicle, the combination of the bent axle A, the elliptic springs B B, mounted on said axle, the shafts C C, mounted on the springs, the brackets F F, secured to the shafts, the vehicle-body I, having irons G G, provided with pintles H H, whereby said body is pivotally suspended from said brackets between the shafts and springs, the cross-bars E E, for connecting the shafts at the front and rear of the vehicle-body, and the straps J J, for connecting the body and cross-bars, substantially as shown and described.

In testimony that I claim the foregoing I have hereunto set my hand and seal.

JOHN G. STOCKS. [L. S.]

Witnesses:
WILMER BRADFORD,
CHAS. E. KELLY.